J. J. SELTENREICH.
SEAM DAMPENING MACHINE.
APPLICATION FILED SEPT. 8, 1913.

1,228,066.

Patented May 29, 1917.
5 SHEETS—SHEET 1.

Witnesses
Frank Blanchard
L. C. French

Inventor:
John J Seltenreich
By Fred Gerlach
his Attorney.

J. J. SELTENREICH.
SEAM DAMPENING MACHINE.
APPLICATION FILED SEPT. 8, 1913.

1,228,066.

Patented May 29, 1917.
5 SHEETS—SHEET 2.

Witnesses:
Frank B. Blanchard
L. C. French.

Inventor:
John J. Seltenreich
By Fred Gerlach
his Attorney.

J. J. SELTENREICH.
SEAM DAMPENING MACHINE.
APPLICATION FILED SEPT. 8, 1913.
1,228,066.
Patented May 29, 1917.
5 SHEETS—SHEET 3.
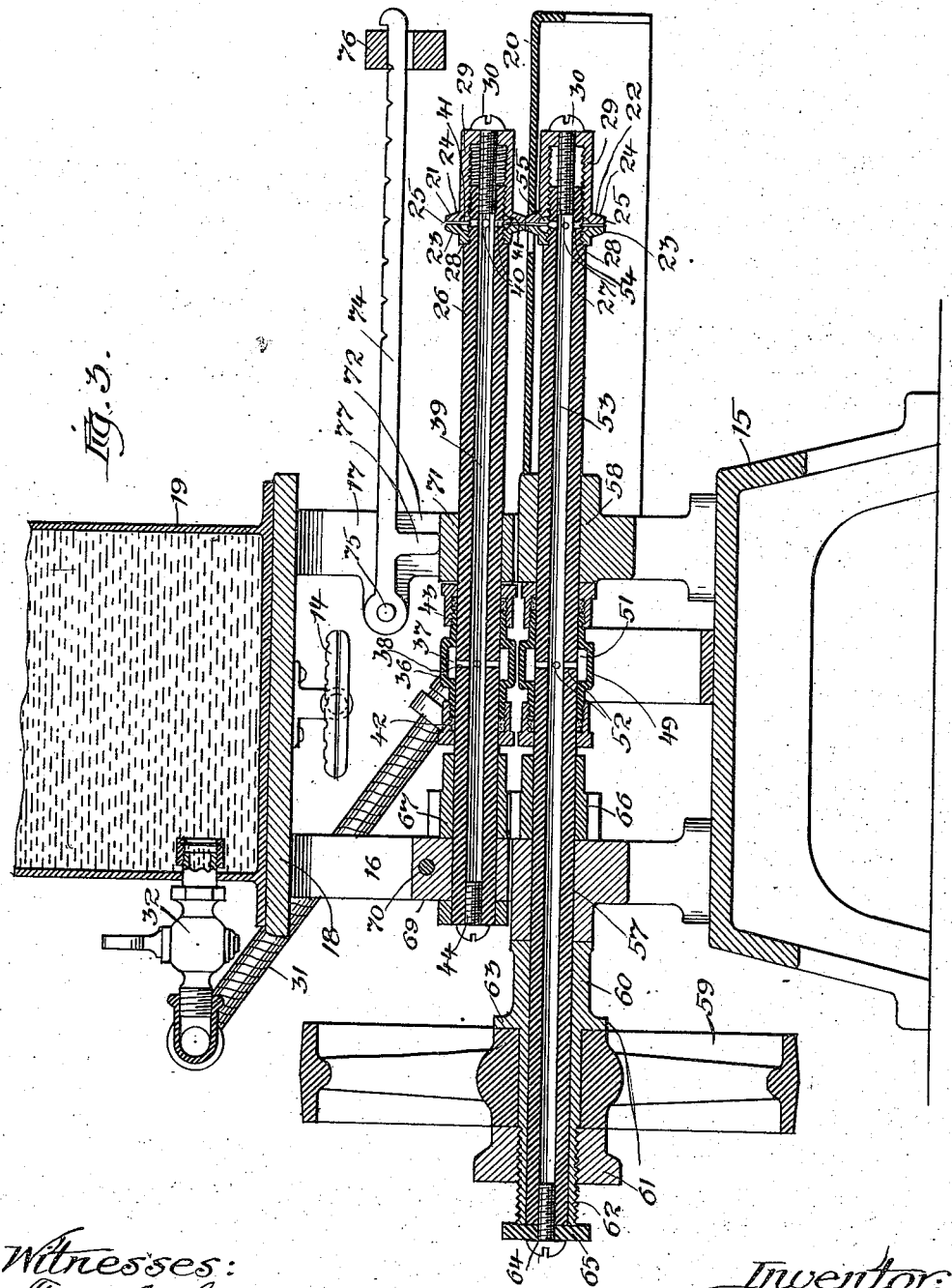

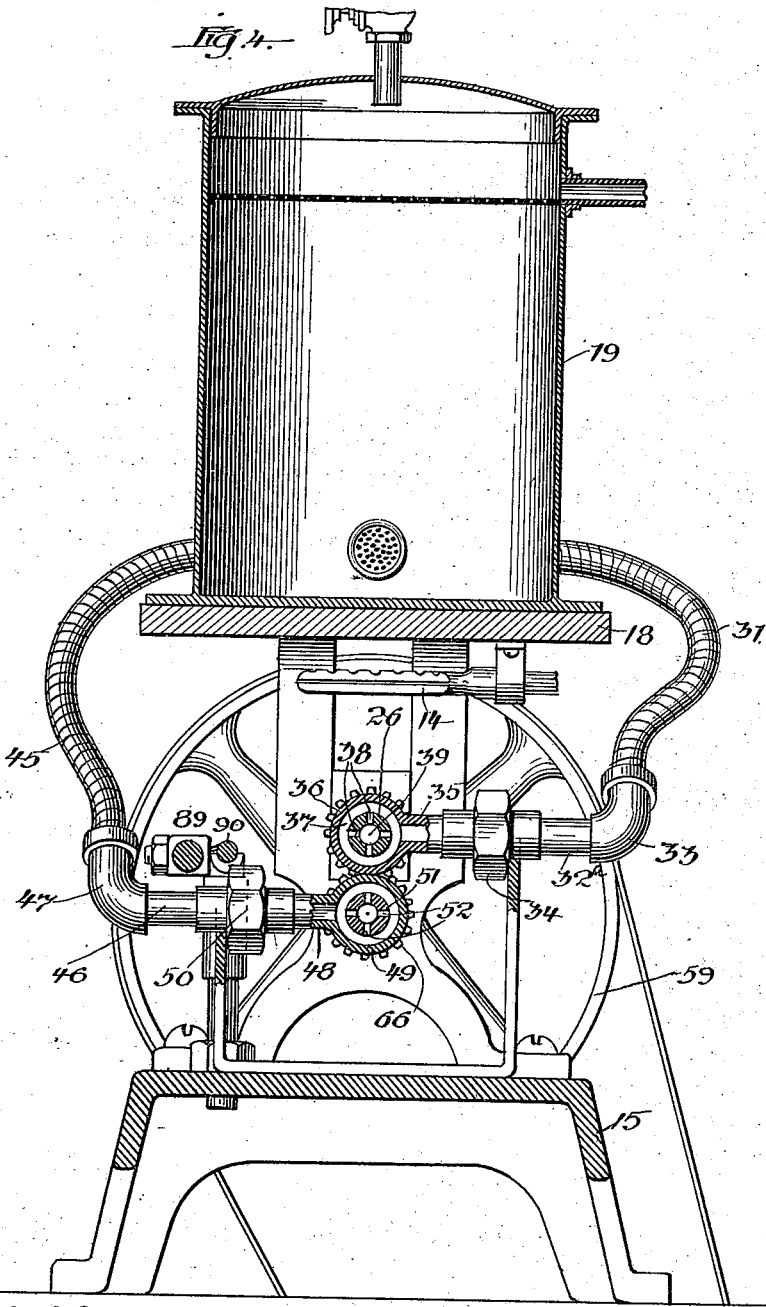

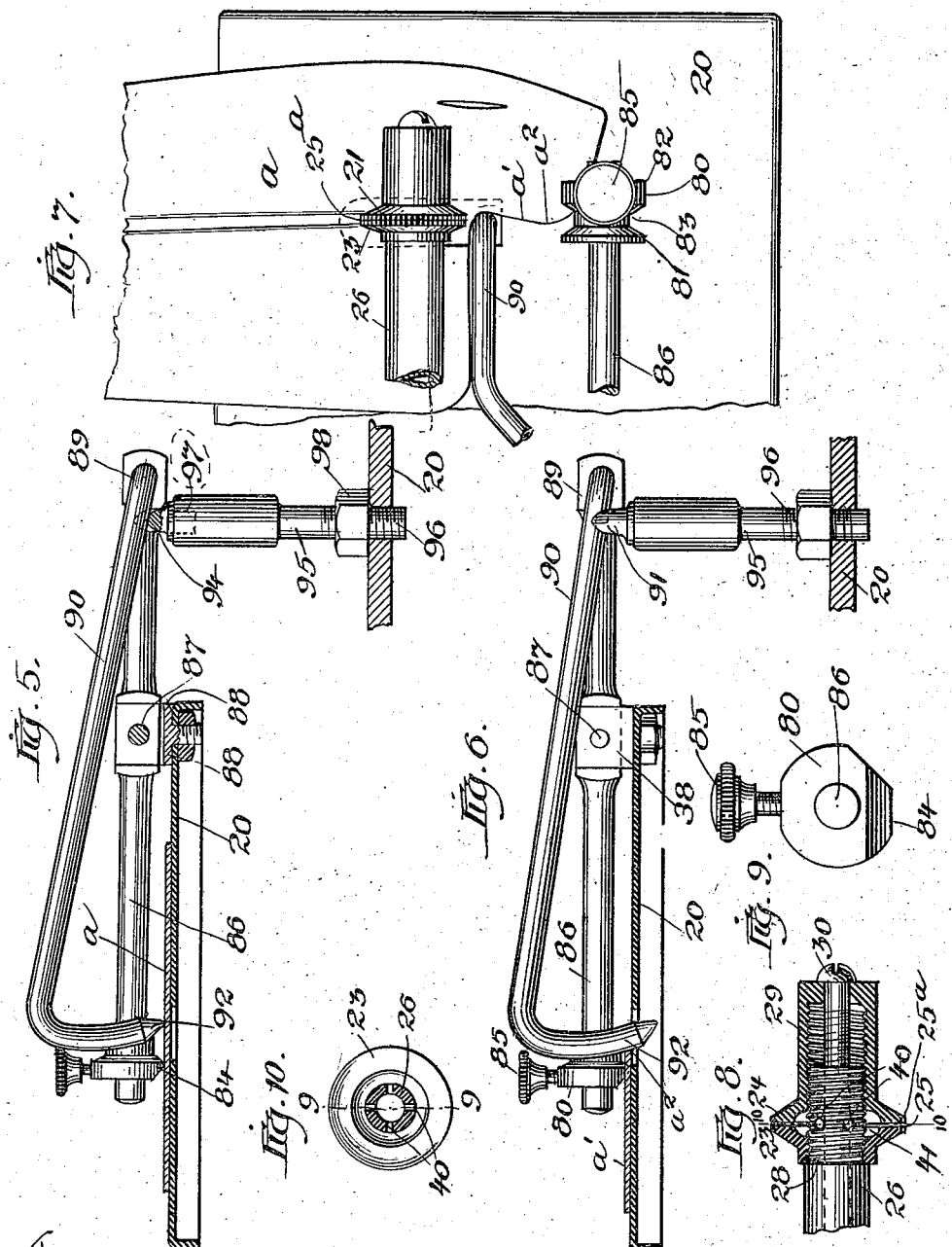

UNITED STATES PATENT OFFICE.

JOHN J. SELTENREICH, OF CHICAGO, ILLINOIS.

SEAM-DAMPENING MACHINE.

1,228,066.  Specification of Letters Patent.  Patented May 29, 1917.

Application filed September 8, 1913. Serial No. 788,602.

*To all whom it may concern:*

Be it known that I, JOHN J. SELTENREICH, a resident of Chicago, in the county of Cook and State of Illinois, have invented certain new and useful Improvements in Seam-Dampening Machines, of which the following is a full, clear, and exact description.

The invention relates to machines for dampening collars adjacent the seam preparatory to folding and ironing them.

It is now common practice to dampen the seams of collars by means of an absorbent cord or belt to which water is fed by immersion or otherwise and which is brought into rolling contact with the seam of the collar.

One object of the invention is to provide an improved dampener in which the use of an absorbent or flexible feeding element, such as a cord, will be dispensed with and in which water will be applied in a definite and uniform quantity to the collar. This object is attained by the employment of wheels which conduct water directly to the collar.

Another object of the invention is to provide an improved collar dampening machine in which water is fed to the dampening wheels through their shafts and by which a uniform quantity of water will be fed to the wheels and applied to the collar.

Another object of the invention is to provide an improved machine in which provision is made for guiding the seam of the collar to the feed-wheels and for pushing the long tab at one end of the collar away from the dampening device so that it will not be dampened.

Other objects of the invention will be apparent from the machine hereinafter described.

The invention consists in the several novel features hereinafter set forth and more particularly defined by claims at the conclusion hereof.

Figure 1:
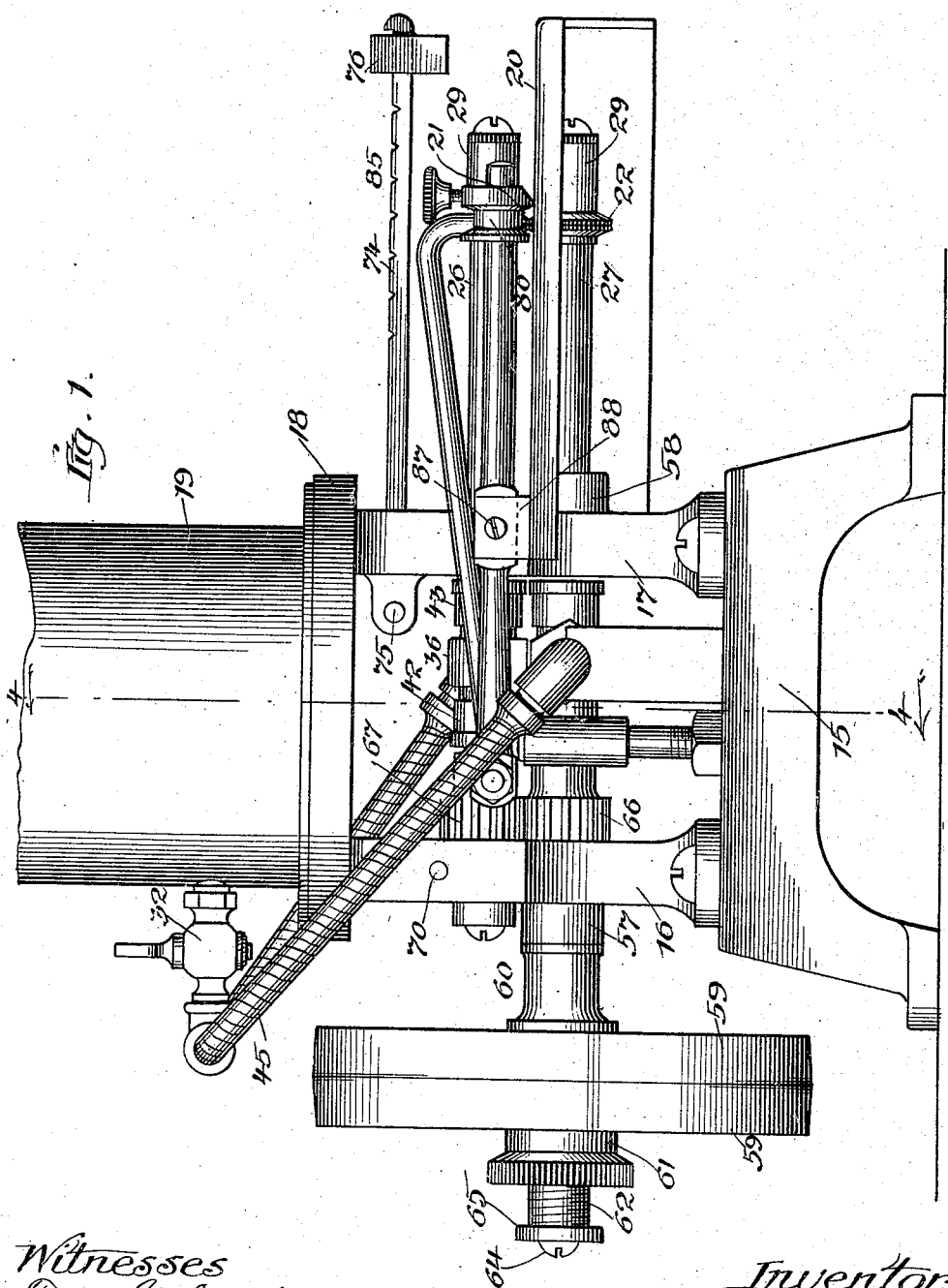
Figure 2:
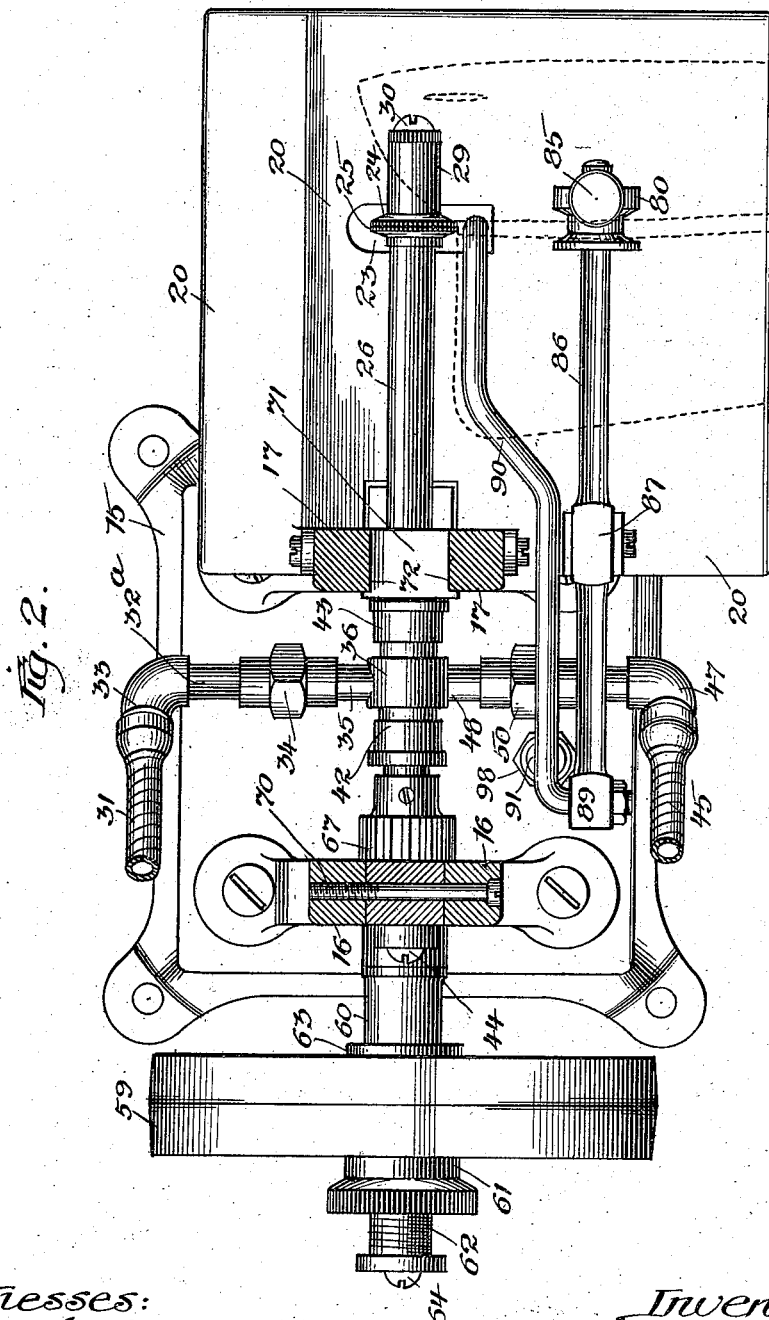

In the drawings: Figure 1 is a side elevation of a machine embodying the invention. Fig. 2 is a plan, parts being shown in section. Fig. 3 is a central longitudinal section. Fig. 4 is a vertical transverse section taken on line 4—4 of Fig. 1. Fig. 5 is a detail of the tripping device in position assumed when the collar is being fed through the machine. Fig. 6 is a similar view showing the tripping device in position assumed when it is operated to deflect the tab on the collar away from the dampening wheels. Fig. 7 is a plan showing the operation of the tripping device. Fig. 8 is a detail of one of the combined feed and dampening wheels. Fig. 9 is a detail of the collar-guide. Fig. 10 is a section taken on line 10—10 of Fig. 8.

The several parts of the machine are mounted upon a base 15. Standards 16 and 17 are secured to the top of said base and a plate 18 is suitably secured to the top of said standards to support a water receptacle 19 above the dampening mechanism so that water will flow thereto by gravity. A gas burner 14, is sustained below the receptacle to heat the water therein. A table 20 is secured to and supported by standard 17 and is adapted to support a collar and guide it to the dampening devices.

Water is supplied to the opposite sides of the collar seam or fold by two wheels 21 and 22 between which the collar passes and which grip the collar and feed it through the machine. Wheel 21 is disposed to engage one side of the seam or fold and wheel 22 is disposed to engage the other side of the seam, the two wheels coöperating to dampen both sides of the seam or fold and to feed the collar between them. Each feed wheel is composed of a pair of disks 23 and 24 which are held in slightly separated relation to leave a space between them for the passage of water to the peripheries of the disks which engage the collar. The periphery of each disk is knurled, as at 25$^a$, to cause the wheels to effectively grip and feed the collar. The upper feed wheel 21 is carried by a hollow shaft 26 and the lower feed wheel 22 is carried by a hollow shaft 27. Each disk 23 is screw-threaded to its shaft and is seated against a shoulder 28 thereon. By securing disk 23 to firmly engage shoulder 28, it will be locked against longitudinal movement on its shaft. Each disk 24 is provided with a sleeve 29 having an internal screw thread for engaging the screw-thread on the end of its shaft and, by turning the sleeve, this disk may be adjusted to and from disk 23 to vary or adjust the space between the faces of the disks through which the water flows to the periphery of the feed wheel. By means of this screw adjustment, the amount of water applied to the collar may be regulated to a nicety. A screw 30 extends through the end of each sleeve 29 and engages a thread in the bore of the shafts 26, and 27 and serves to lock one of the disks 24 in the desired spaced relation to its coöperating disk 23. Each of these feed wheels exemplifies a dampening device which is composed of rigid or metallic parts and dispenses with the use of an absorbent or flexible conductor, and one which will evenly dampen the collar.

Water is supplied to the hollow shaft 26 by a flexible pipe 31 which is connected to a cock 32 which controls the flow of water from reservoir 19. This flexible pipe is connected to a short pipe-section 32ª by an elbow 33 and said pipe-section is connected by a union coupling 34 to a nipple 35 on a hollow collar 36 which fits around shaft 26. Water passes from nipple 35 to an annular channel 37 in collar 36 and thence through holes 38 in shaft 26 to a duct 39 extending longitudinally through shaft 26. Through duct 39 the water passes to holes 40 which conduct the water to an annular chamber 41 formed in disks 23 and 24 of feed wheel 21. The space between disks 23 and 24 is in communication with channel 41. Packing boxes 42 and 43 are provided at the ends of collar 36, respectively, to prevent leakage of water between the collar and shaft 26. A screw 44 closes one end of duct 39 in shaft 26.

Water is supplied to the lower shaft 27 by a flexible pipe 45 which is also connected to cock 32 and to a pipe-section 46 by an elbow 47. Said pipe section is connected to a nipple 48 on a collar 49 by a union coupling 50. Collar 49 fits around shaft 27 and is provided with an annular channel 51 to which the water passes from nipple 48. Holes 52 in shaft 27 conduct water from channel 51 to the horizontal duct 53 in said shaft. From duct 53 the water passes through holes 54 to a chamber 55 formed in disks 23 and 24 on shaft 27 and said chamber communicates with the space 25 between said disks so that water will flow to the periphery of the disks. The combined feed and dampening wheels are rotated in opposite directions by mechanism hereinafter set forth. The passages 25 are so small that capillary attraction and centrifugal force will cause the water supplied to the passages 25 to be evenly distributed and constantly fed to the peripheries of the feed and dampening wheels.

Shaft 27 is mounted in fixed bearings 57 and 58 in standards 16 and 17, respectively, and is driven by a belt pulley 59. A sleeve 60 is secured to one end of said shaft and pulley 59 is adapted to be locked to the shaft by a collar 61 which has a screw thread engaging a thread 62 on said sleeve and is adapted to clamp the hub of the pulley against a shoulder 63 on said sleeve. The trend of said screw thread is in such direction that if collar 61 is held against rotation by the operator, while the sleeve and shaft are being driven, the collar will be rotated away from the pulley to release it. To cause the shaft to be driven, collar 61 will be turned toward the pulley by the operator. A screw 64 closes the end of duct 53 in shaft 27 and holds a stop washer 65 against the end of the shaft and sleeve 60. This washer prevents the collar 61 from being turned off the sleeve 60. A gear 66 secured to shaft 27 meshes with a corresponding gear 67 which is secured to shaft 26 so that both shafts will be driven in opposite directions at the same speed.

The upper feed wheel shaft 26 is pivotally sustained so that sufficient pressure may be exerted against the collar to cause the latter to be fed forwardly during the rotation of shafts 26 and 27. For this purpose, shaft 26 is journaled in a bearing 69 which is pivotally sustained in bracket 16 by a pin 70 and a bearing 71 which is slidably held in a way 72 formed in bracket 17. Pressure is applied to bearing 71 to press feed wheel 21 against the collar by a lever 74 which is pivoted to bracket 17, as at 75, carries an adjustable weight 76 and has an arm 77 engaging bearing 71. By means of this lever and the movable bearings for shaft 26, feed wheel 21 will be raised slightly when a collar is placed between the feed wheels and the necessary pressure will be applied to wheel 21 to cause the feed wheels to positively feed the collar forwardly and to dampen the seam as the collar is fed along over table 20.

Collars with a turned edge are usually provided with a seam at their edge, are curved when flattened out and have a tab at one end which is curved to fit under the folded edge of the other end of the collar. A guide 80 having a channel adapted to receive the seam of a collar, is adapted to guide the collar to the feed wheel. This guide comprises flanges 81 and 82 between which a flared channel 83 is formed. The lower portions of said flanges are flattened, as at 84, and are adapted to rest upon the collar at the sides of the seam at the fold. A set screw 85 secures guide 80 to a lever 86 which is pivoted as at 87 to a bracket 88 secured on the top of table 20. The end of this lever opposite to that on which guide 80 is secured, is pivotally connected, as at 89, to a trip lever 90. The latter lever is fulcrumed upon an adjustable abutment 91 and its distal end is provided with a curved foot 92 which, when guide 80 is held raised by the collar passing between the feed and dampening wheels, will be disposed above the collar being dampened. After the end of the collar has passed under guide 80, the latter will drop onto table 20 and at such time the curved tab $a'$ on the collar $a$ will be approaching the feed wheels, as indicated in Fig. 7. This drop of guide 80 will cause the foot 92 of lever 90 to be lowered, and the curved edge $a^2$ of tab $a'$ will rub against the edge of said foot, as it is being advanced by the feed wheels, so that the foot will deflect the tab and prevent it from passing into the bite of the feed and dampening wheels.

The movement of guide 80 is necessarily limited to the thickness of the collar by which it is raised, and it is important that the trip lever 90 should be quickly operated in response to this slight movement. To insure the necessary movement of lever 90, its fulcrum 91 is provided with an open seat 94 and is located at the upper end of a post 95 which is provided with a screw thread 96 engaging a corresponding thread in table 20. The fulcrum 91 rests in a socket 97 in the upper end of post 95. A nut 98 is adapted to lock post 95 in position. By turning post 95, it may be raised or lowered to regulate the operation of lever 90 to a nicety and to insure its prompt operation.

In operation, the operator will place that end of the collar which does not have an upwardly curved tab $a'$ on it, on the table 20 and push it under guide 80, the seam being directed into channel 83 of said guide. The collar will raise guide 80 to operate levers 86 and 90, to raise the deflecting toe 92 to clear the collar. The collar will then pass into the bite of the feed rolls 21 and 22 which will feed the collar forwardly and in doing so will dampen the seam. When the tab $a'$ has passed under guide 80, the latter will drop and cause the deflecting toe 92 of lever 90 to be lowered into position to deflect the tab which is being fed onwardly by the feed wheels to engage the toe and be deflected laterally away from the feed wheels.

The invention thus exemplifies a seam dampening machine, which applies water evenly and directly to the seam of a collar; in which the dampening may be accurately regulated; which dispenses with the use of absorbent water conductors; which is adapted for use with hot water; which prevents the projecting tab from being dampened; and which automatically guides the seam of the collar to the feed wheels after it has been placed into the bite of the wheels by the operator.

The invention is not to be understood as restricted to the details set forth, since these may be modified within the scope of the appended claims without departing from the spirit and scope of the invention.

Having thus described my invention, what I claim as new and desire to secure by Letters Patent, is:

1. In a seam dampening machine comprising the combination of a combined feed and dampening wheel, means for driving the wheel, said wheel comprising two members spaced apart with a free water passage between them, and means for supplying water to flow outwardly through said passage to a collar.

2. In a seam dampening machine comprising the combination of a dampening wheel, comprising two members spaced apart with a free water passage between them and having peripheral feed-surfaces thereon, a shaft having a water-duct therein communicating with said passage, means for supplying water to the duct, and means for rotating said shaft.

3. In a seam dampening machine comprising the combination of a wheel comprising two members spaced apart with a free water passage between them, a chamber of a greater width than said passage being formed in the wheel between said passage and the shaft, a shaft having a water duct therein and a port between said chamber and said duct, means for supplying water to the duct, and means for rotating the shaft.

4. In a seam dampening machine, the combination of a pair of feed-wheels, dampening means, mechanism for operating the wheels, a lever for deflecting the tab on a collar, a collar-guide and a lever pivotally sustained between its ends, on which the guide is mounted so as to be shifted by the collar, the feed-deflecting lever being pivoted to the guide carrying lever.

JOHN J. SELTENREICH.

Witnesses:
 FRED GERLACH,
 L. O. FRENCH.

Copies of this patent may be obtained for five cents each, by addressing the "Commissioner of Patents, Washington, D. C."